March 8, 1949.  W. G. SCHARMANN  2,463,912
SYNTHESIS OF HYDROCARBONS
Filed Dec. 12, 1946
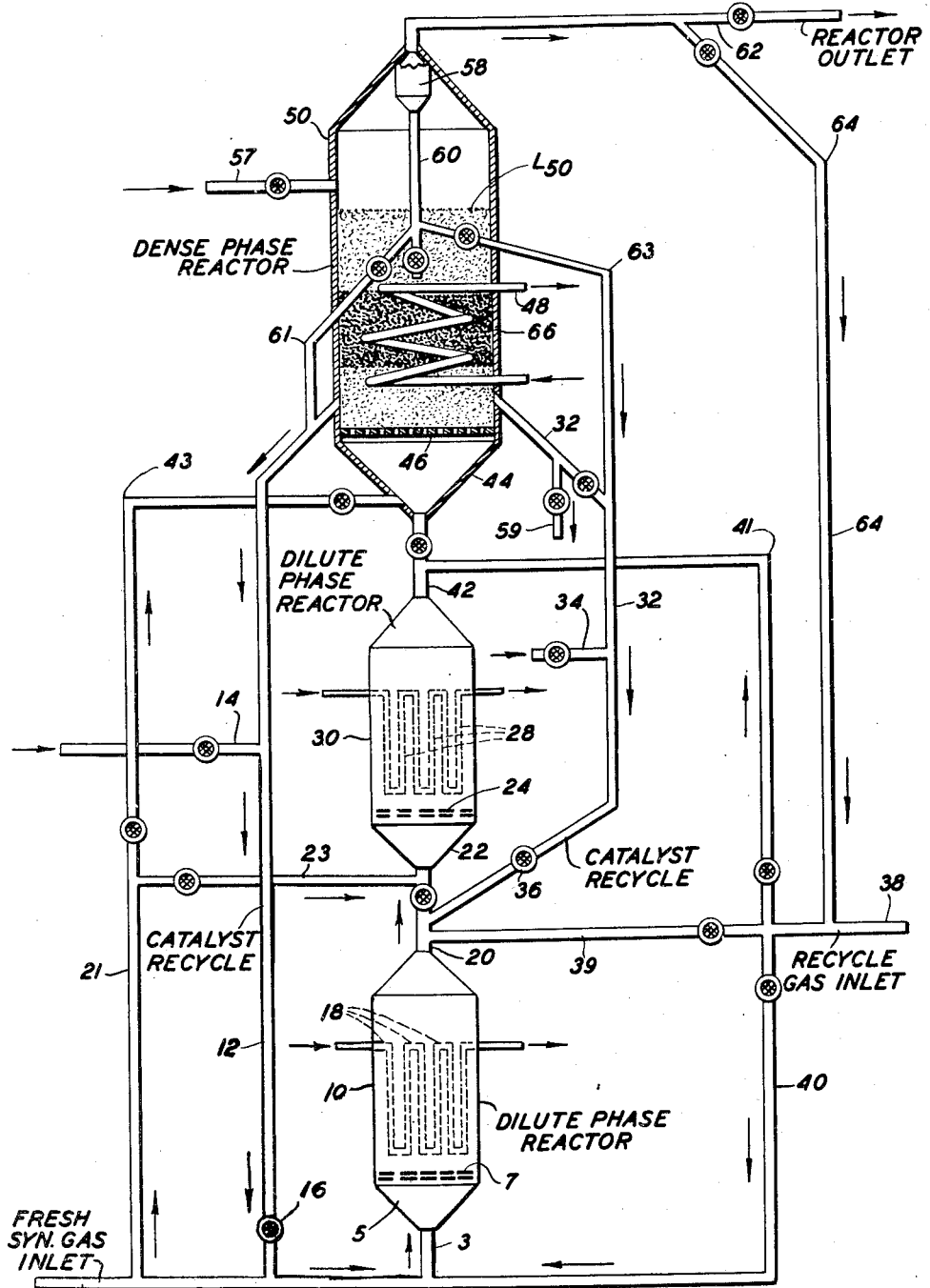
INVENTOR:
WALTER C. SCHARMANN,
BY J. Cashman
ATTORNEY Patented Mar. 8, 1949

2,463,912

UNITED STATES PATENT OFFICE 2,463,912

SYNTHESIS OF HYDROCARBONS

Walter G. Scharmann, Westfield, N. J., assignor to Standard Oil Development Company, a corporation of Delaware Application December 12, 1946, Serial No. 715,798

15 Claims. (Cl. 260—449)

The present invention relates to the manufacture of valuable synthetic products by the catalytic conversion of carbon oxides with hydrogen. The invention is more particularly concerned with an improved method for maintaining the activity and preventing the disintegration of catalysts used in the catalytic conversion of carbon monoxide with hydrogen to form hydrocarbons having more than one carbon atom per molecule and oxygenated products, wherein a finely divided catalyst is suspended in the gaseous reactants.

The synthetic production of liquid hydrocarbons from gas mixtures containing various proportions of carbon monoxide and hydrogen is already known and numerous catalysts, normally containing an iron group metal, have been described which are specifically active in promoting the desired reactions at certain preferred operating conditions. For example, cobalt supported on an inert carrier is used when relatively low pressures (atmospheric to about 5 atmospheres) and low temperatures (about 375°–425° F.) are applied in the manufacture of a substantially saturated hydrocarbon product, while at the higher temperatures (about 450°–750° F.) and higher pressures (about 5–25 atmospheres and higher) required for the production of unsaturated and branched-chain products of high anti-knock value, iron-type catalysts are more suitable. In both cases, the activity of the catalyst declines steadily in the course of the strongly exothermic reaction chiefly due to the deposition of non-volatile conversion products such as carbon, paraffin wax and the like, on the catalyst.

Various methods of preventing these changes in catalyst characteristics have been proposed including continuous or intermittent extraction of the catalyst in-situ with suitable solvents, intermittent in-situ treatment of the catalyst with hydrogen and/or steam at the conversion temperature or higher temperatures or continuous hydrogen treatment of powdered catalyst continuously circulated from and to the conversion zone through a suitable regeneration zone, etc.

All these methods contemplate the removal of catalyst deposits after their formation, rather than the prevention of the formation of the deposits as such. Moreover, these methods operate efficiently only to the extent to which catalyst deactivation is due to the deposition of high-molecular weight hydrocarbon products such as paraffin wax. However, the deactivation of iron catalysts appears to be caused, to a substantial extent, by the deposition of fixed carbon or coke-like material formed by the dissociation and cracking of carbon monoxide and unstable hydrocarbons, which take place at the higher temperatures and pressures associated with the use of iron-base catalysts. Deposits of this type cannot be efficiently removed or prevented by the known reactivation methods.

If allowed to accumulate excessively, these carbon or coke deposits also adversely affect those characteristics of the catalyst which determine its utility as a fluidizable solid in processes employing the so-called fluid solids technique in which the reactants are contacted with a dense turbulent bed of finely divided catalyst fluidized by the gaseous reactants and reaction products. More particularly, carbon or coke deposits have been found to cause rapid disintegration of the catalyst particles leading to a substantial and undesirable expansion of the fluidized bed and ultimately to the requirement of complete catalyst replacement because of fluidization difficulties. Catalyst broken down in this manner must be restored to a fluidzable particle size or is lost for further use.

My invention relates to an improved process by which the deposition of carbon or coke-like deposits on catalysts, particularly iron catalysts, used in the synthesis of hydrocarbons from carbon monoxide and hydrogen may be prevented or substantially reduced.

It is, therefore, the main object of my invention to provide an improved process for converting carbon monoxide and hydrogen in the presence of a catalyst into normally liquid hydrocarbons and other valuable products.

Another object of my invention is to provide improved means for preventing or substantially reducing the deposition of carbon or coke-like deposits on catalysts used in the catalytic conversion of carbon monoxide and hydrogen into valuable synthetic products.

A more specific object of my invention is to provide improved means for preventing or substantially reducing carbon or coke-like catalyst deposits and resulting catalyst disintegration of subdivided catalysts used in the synthesis of hydrocarbons from carbon monoxide and hydrogen employing the fluid solids technique or catalyst-gas suspensions of a similar type.

A still more specific object of my invention is to prevent or reduce carbon or coke-like catalyst deposits and resulting disintegration of subdivided iron catalysts used in the catalytic synthesis of hydrocarbons from carbon monoxide and hydrogen employing the fluid solids technique.

Other objects and advantages will appear hereinafter.

It has been found that when iron catalysts are used in fixed bed operation involving passage of the synthesis feed gas through catalyst tubes surrounded by a suitable cooling medium, carbon is deposited predominantly in the catalyst layers first contacted by the feed gas. Temperature measurements have indicated that the proportion of the synthesis reaction which takes place on these initially contacted catalyst layers is considerably greater than the proportion of these catalyst layers in relation to the total height of the catalyst column contacted by the synthesis gas. For example, about 80–90% of the total amount of synthesis gas converted in a single pass may be converted on the first 5–10% of the catalyst column contacted. As a result, very large amounts of heat are released over a relatively limited area. The heat transfer surface provided on the basis of a release of approximately the same total amount of heat distributed over the entire catalyst column must become insufficient in the catalyst section initially contacted, thus leading to overheating and excessive carbonization in this section.

Theoretically, the conditions should be more favorable when employing the fluid solids technique. In this type of operation the synthesis gas passed upwardly through a dense suspension of finely divided catalyst in the reacting gases and product vapors and this dense suspension is maintained in a highly turbulent state by the use of proper gas velocities to resemble a boiling liquid with respect to apearance, heat transfer characteristics and hydrostatic and dynamic heads. The heat released is usually absorbed by the use of heat exchange elements placed in direct contact with the dense turbulent mass of catalyst. The free motion of the catalyst particles permits rapid and uniform distribution of the heat released throughout the catalyst bed. As a result, the inherent heat transfer characteristics of fluidized solids beds of this type are far superior to those of fixed catalyst beds.

However, in spite of this substantial improvement with respect to heat transfer severe carbonization and disintegration of iron catalysts has been observed even in fluid operation. Apparently, the improvement in heat transfer characteristics is insufficient to cope with the increase in catalyst reactivity which probably results from the larger surface of the more finely divided catalyst used in fluid as compared with fixed operation.

Experiments designed to yield information on the causes of carbon formation in fluid operation have demonstrated that even at highest space velocities (i. e. volumes of synthesis gas passed through the reactor per volume of catalyst bed per hour) about 70–80% of the $CO+H_2$ feed may be converted and that by decreasing the space velocity to, say about $\frac{1}{10}$ all other conditions being equal, the conversion is increased only by, say $\frac{1}{4}$–$\frac{1}{5}$ to about 95–98%. It follows that about 90% of the total conversion of 95–98% obtainable at low space velocities is obtainable at about 10 times higher space velocities. Therefore, about 90% of the total conversion obtainable at the low space velocity will take place and a corresponding amount of heat will be released within the $\frac{1}{10}$ of the catalyst volume first contacted in which, considered by itself, the 10 times higher space velocity prevails since the absolute gas throughput is constant and the catalyst volume considered is only $\frac{1}{10}$ of the total.

In other words, when attempting to operate at substantially complete conversion of $CO+H_2$ in a single "fluid" reactor a very high heat load is imposed on the lower catalyst zone first contacted, in a manner similar to fixed bed operation, with the difference that heat dissipation is greatly enhanced by the superior heat transfer characteristics of the fluidized solids bed. This improved heat dissipation may be sufficient to cope with heat releases of the order of about 20,000 B. t. u. per cu. ft. of catalyst per hour and to establish substantial uniformity of temperature throughout the fluidized bed where there are only small differences between the rates of heat release at the top and bottom of the bed as is the case for example in the oxidizing regeneration of spent catalysts deactivated by carbon deposits. However, differences in heat release rates of another order of magnitude occur in the hydrocarbon synthesis wherein a heat release of the order of 1,000,000 B. t. u. per cu. ft. of catalyst per hour may be obtained at the bottom and hardly any heat release at the top of the catalyst bed. It appears that differences of this magnitude can not be compensated by the improved heat transfer characteristics of the fluid solids technique nor by any other conceivable improvement of heat transfer characteristics.

Evaluating the findings outlined above, I have approached the problem from a different direction with a view toward controlling the high degree of reactivity or heat release normally obtained at the catalyst section which is adjacent to the feed gas inlet to a dense fluidized catalyst bed. I have found that the heat released immediately upon the first contact of concentrated feed gas with finely divided catalyst may be readily controlled within desirable limits by a control of the apparent density of the suspension of finely divided catalyst first contacted by the concentrated feed gas.

In other words, the concentrated highly reactive feed gas is first contacted with a relatively dilute catalyst phase. The quantity of catalyst admitted to said dilute phase, in combination with the temperature and particle size of the catalyst, is so adjusted that a desired, controlled, degree of conversion takes place at a controlled release of heat over an extended path which may be readily adjusted to permit efficient heat dissipation by conventional heat exchange means and to avoid overheating and excessive catalyst carbonization.

The dilute phase reaction is preferably carried out in several successive stages which may be independently controlled with respect to catalyst supply, bed density and reaction temperature until the conversion has reached a stage, say about 50–80%, at which further conversion requires a considerably more intensive contact between reactants and catalyst. At this point, the reactants are contacted with a catalyst phase of high density at conditions of temperature and gas flow allowing for completion of the conversion at a relatively low average rate of heat release. The use of one or more dilute phase conversion zones followed by a dense phase clean-up zone in the manner outlined above, provides a convenient means of controlling reactivity and resulting heat release to a point at which individual catalyst particles are no longer overheated and carbonization as well as disintegration of catalyst particles are substantially avoided in spite of an ultimate substantially complete conversion of the reacting gases.

In the preferred type of operation, the reacting gases are passed upwardly and in series through 2 or more reactors provided with conventional heat withdrawal means adequate to dissipate the heat released in these reactors, and this, at superficial gas velocities adapted to establish relatively dilute catalyst phases at the prevailing particle size and to carry the catalyst entrained in gas in upward flow through the successive reactors into the final dense phase reactor from which catalyst is recirculated in controlled streams to the initial and, if desired, any subsequent dilute phase reactor. Product gas may be recycled to any or all of the various stages in order to control the desired flow velocities and/or the partial pressures of the constituents of the gas phases within the reactors.

While the advantages of my invention are realized when using any synthesis catalyst tending to form carbon or coke-like deposits during the synthesis reaction, my preferred catalysts are such highly reactive and selective iron catalysts as iron obtained from natural or artificial iron oxides or sulfides and promoted with small amounts of promoters such as alkali oxides or halides, particularly potassium chloride or fluoride.

In general, superficial gas velocities of about 1–20 ft. per second at particle sizes varying from about 5 to 150 microns are suitable to establish desired dilute phase densities of about 0.5 to 10 lbs. per cu. ft. at space velocities of about 2,000–20,000 v. v. hr. of fresh CO and $H_2$. The dense phase reactor is preferably operated at low gas velocities of about 0.1–3 ft. per second to obtain bed densities of about 20–150 lbs. per cu. ft. at reduced space velocities of less than about 5,000 v. v. hr. of fresh CO and $H_2$. The desired differences in the superficial gas velocities within the individual reactors may be established by a proper choice of reactor diameters in combination with proper gas recycle ratios.

It may be desirable to circulate to the dilute phase reactors only particles of a certain narrow size range. For this purpose, I may effect a classification of particles in the dense phase reactor, for example, by providing a non-fluidizable packing within said dense phase reactor and recirculate catalyst from a packed reactor section containing particles of the desired size. A substantial proportion of fine catalyst particles may be maintained in the dilute phase reactors by circulating to these reactors fines separated from the dense phase overhead by means of conventional gas-solids separators.

An additional control of conversion and heat release rates in the individual reaction zon may be accomplished by properly adjusting the reaction temperature in the individual stages. For example, the reaction temperatures in the individual reaction zones may be staggered from a level falling within the approximate range of about 500°–650° F. in the initial zone to a level within the range of about 550°–700° F. in a subsequent dilute phase zone and to a level within the range of about 600°–800° F. in the dense phase final zone.

It may also be desirable to supply certain proportions of the total fresh gas feed to one or more of the reactors subsequent to the reactor of the first gas-catalyst contact in order to provide a further independent means of controlling reaction temperature, degree of conversion and/or flow velocity in the individual stages.

Having set forth the general nature and objects, the invention will be best understood from the subsequent more detailed description in which reference will be made to the accompanying drawing which illustrates a system suitable for carrying out a preferred embodiment of the invention.

Referring now in detail to the drawing, the system illustrated therein consists essentially of three superimposed conversion zones or reactors 10, 30 and 50 whose functions and cooperation will be forthwith explained using as an example the conversion of CO and $H_2$ over an iron catalyst at temperatures of between about 500° and about 750° F. and pressures of about 100–1,000 lbs. per sq. in. gauge. It should be understood, however, that this system is readily adaptable to other conversion conditions of temperature, pressure and catalyst composition.

In operation, fresh synthesis gas comprising CO and $H_2$ in the desired proportions of, say, about 1 to 1.8 is supplied through lines 1 and 3 to the lower conical portion 5 of reactor 10 and enters the cylindrical main section of reactor 10 through a foraminous distributing member such as grid 7. The fresh synthesis gas may be preheated to any desired temperature of, say, 100°–650° F., particularly during the starting period.

Finely divided iron catalyst of a fluidizable particle size, preferably within the range of about 5–125 microns is fed from reactor 50 to line 1 by any conventional means such as standpipe 12 which is aerated through one or more taps 14 to facilitate the solids flow therethrough. Control valve 16 in standpipe 12 permits a proper adjustment of the catalyst feed to reactor 10. The combined gas and pseudo-hydrostatic pressures above valve 16 must be at least sufficient to overcome the gas pressure within line 1 which may be anywhere between about 100 and 1,000 lbs. per sq. in. and is preferably maintained at about 200–600 lbs. per sq. in. gauge.

The catalyst entering pipe 1 is suspended in the feed gas and enters with the latter reactor 10 through grid 7. The superficial gas velocity within reactor 10 and the flow of catalyst through valve 16 are so controlled that a dilute suspension of catalyst in gas having an apparent density of about 0.5–5 lbs. per cu. ft. is formed within reactor 10. Superficial gas velocities of about 3–20 ft. per second and catalyst feed rates of about $\frac{1}{10}$ to 3 lbs. per cu. ft. of total gas fed to the reactor to establish a space velocity of about 4,000–15,000 v. v. hr. of fresh CO and $H_2$ are generally suitable for this purpose. At these conditions, a limited turbulence and slippage of catalyst particles relative to the gas movement take place sufficient to permit an efficient heat transfer to the cooling surfaces 18 without interfering with the ultimate complete carry-over of the catalyst overhead through line 20 into reactor 30.

As a result of the relatively low catalyst to gas ratio in reactor 10, the conversion rate within reactor 10 remains at a relatively low level of, say, about 25–45% of the fresh CO and $H_2$ fed. The heat release is likewise comparatively low amounting to about 50,000–300,000 B. t. u. per cu. ft. of catalyst suspension per hour. Heat quantities of this order may be readily dissipated by conventional cooling means 18 to maintain a desirable reaction temperature within the range of about 500°–650° F. throughout reactor 10.

A mixture of product vapors and unreacted feed gas carrying suspended catalyst leaves reactor 10 overhead through line 20 and enters reactor 30 through its conical bottom portion 22 and grid 24, substantially at the temperature of reactor 10. Reactor 30 is preferably operated at conditions permitting a conversion rate and heat release similar to those prevailing in reactor 10 at a space velocity falling within the approximate range indicated in connection with reactor 10. In order to accomplish this, means must be provided to compensate for the reduced reactivity of the partially reacted feed gas. For this purpose, I may increase the phase density to about 2–15 lbs. per cu. ft. either by reducing the superficial gas velocity to about 1–15 ft. per second or by supplying additional catalyst from dense phase reactor 50 through standpipe 32 aerated through one or more taps 34 and provided with control valve 36, in a manner similar to standpipe 12, or by a combination of these means. In place of, or supplementing the increase in bed density I may slightly raise the reaction temperature to, say, about 550°–650° F. by properly operating cooling means 28 to raise the reactivity to about the level prevailing in reactor 10 and/or by admitting a controlled amount of fresh highly reactive synthesis gas through lines 21 and 23.

It will be understood, of course, that operation of reactors 10 and 30 at similar conversion levels is desirable merely for considerations of design economy and I do not wish to limit myself to this type of operation. For example, it is within the scope of my invention to use only a single, properly dimensioned, dilute reaction zone or more than 2 such reaction zones as long as the essential purpose of the invention is accomplished, i. e. to carry out a major proportion of the conversion at a controllable release of heat which may be efficiently dissipated by technically feasible heat transfer means. It should also be noted that the superficial gas velocities and bed densities and thus the conversion rates within the individual reactors 10 and 30 may be independently controlled and adjusted by a suitable operation of catalyst feed lines 12 and 32 in combination with gas recycle lines 38, 39 and 40 through which hot or cold recycle gas may be supplied to reactors 10 and 30 in any desired ratio.

A mixture of reaction products and feed gas now converted to, say, about 50–90% and carrying suspended catalyst leaves reactor 30 overhead through line 42 and may enter dense phase reactor 50 directly and substantially at the temperature of reactor 30 through conical portion 44 and grid 46. Reactor 50 should have a substantially larger diameter than reactors 10 and 30 to obtain the desired decrease of the superficial gas velocity to about 0.1–3 ft. per second and the desired catalyst bed density of about 25–100 lbs. per cu. ft. which are required to accomplish substantially complete conversion at the now considerably reduced gas reactivity. Since only about 10–50% conversion takes place in reactor 50, it will be readily appreciated that the heat release will rarely exceed about 300,000 B. t. u. per cu. ft. of catalyst per hour at a reduced space velocity of less than about 5,000 v. v. hr. of unreacted CO and $H_2$. Heat quantities of this order may be easily dissipated through conventional cooling means 48, particularly in view of the excellent heat transfer characteristics of the highly turbulent, truly fluidized, dense catalyst phase within reactor 50. If desired, the reaction temperature in reactor 50 may be kept at a slightly higher level of, say, about 650°–750° F. to speed up the completion of the conversion by controlling heat withdrawal means 48 and/or adding fresh synthesis gas through line 43.

Catalyst from reactor 50 is supplied under the pseudo-hydrostatic pressure of the dense catalyst phase in reactor 50, through lines 12 and/or 32 to reactors 10 and/or 30 respectively as outlined above. Vaporous reaction products and tail gas carrying small amounts of catalyst fines, leave dense phase level $L_{50}$ overhead and are passed through a conventional gas-solids separator such as cyclone separator 58. Separated catalyst fines may be returned through pipe 60 to the catalyst bed of reactor 50. Reaction products and tail gas, substantially free of suspended catalyst leave the system through line 62 to be passed to a conventional product recovery plant (not shown) from which tail gas may be recycled to line 38. A by-pass line 64 may be used to supply hot recycle gas to line 38.

As previously mentioned, it may be desired to circulate through lines 12 and/or 32 a catalyst mass containing substantial proportions of small sized catalyst particles. For this purpose I may branch off separated catalyst fines from return pipe 60 and pass the same through lines 61 and/or 63 to catalyst recycle lines 12 and/or 32. I may also provide a non-fluidizable packing 66 of Raschig rings or similar bodies, which is known to effect a satisfactory classification of fluidized particles according to size. In the latter case, recycle catalyst is withdrawn from within or from above packing 66.

While I have shown reactors 10 and 30 as being provided with cooling coils 18 and 28, respectively, it should be understood that the catalyst suspension of these reactors may be maintained within a plurality of elongated tubes of relatively small diameter surrounded by a suitable cooling medium in an arrangement similar to an ordinary heat exchanger. Reactor 50 may be similarly designed if desired.

At the conditions set forth in the preceding description of my invention, the hydrocarbon synthesis on catalysts of high activity and selectivity to liquid products but normally strong carbonization tendency such as, for example, an iron catalyst obtained by a suitable reduction of a composite containing about 95.4 parts by weight of $Fe_2O_3$, 2.6 parts by weight of $Al_2O_3$, 2.0 parts by weight of $K_2O$ and 1.4 parts by weight of $SiO_2$, may be operated in a fully continuous manner at constant operating conditions for several hundred hours with high liquid yields approaching or exceeding 200 c. c. of $C_4+$ hydrocarbons per cu. m. of $CO+H_2$ converted, without appreciable catalyst carbonization and disintegration which would result in catalyst bed expansion, catalyst losses and difficulties in process control. On the other hand, when using the same catalyst in conventional fluid dense phase operation at otherwise comparable reaction conditions to obtain similar yields changes observed after 100 hours of operation include the following. The carbon content of the catalyst has risen from close to zero to over 30% by weight of iron, which is equivalent to about 0.8–1% of the CO reacted. The proportion of catalyst fines of 0–20 microns size has increased by about 350% resulting in an increase of catalyst bed volume by about 250% and a decrease of catalyst bed density from about 55 lbs. per cu. ft. to about 14 lbs. per cu. ft. These changes necessitate a rapid catalyst replacement and a current readjustment of operating conditions.

The system illustrated by the drawing permits of various modifications. The temperature control effected by cooling means 18, 28 and 48 may be assisted by cooling the catalyst circulated through lines 12 and/or 32 to any desired temperature below reaction temperature in any manner known per se, for example, by arranging coolers in the catalyst path or by injecting cooling liquid into lines 12 and/or 32 which vaporizes at the catalyst temperature. Other conventional means for conveying fluidized solids such as pressurized feed hoppers, mechanical conveyors, or the like may take the place of standpipes 12 and/or 32. Fresh make-up catalyst may be supplied through line 57 and spent catalyst may be withdrawn through line 59 in a continuous or intermittent manner. Only one or more than the two dilute phase reactors shown may be provided and the size of these reactors may be varied as indicated by considerations of design and operating economies.

Other modifications within the scope of my invention may appear to those skilled in the art.

While the foregoing description and exemplary operations have served to illustrate specific applications and results of my invention, other modifications obvious to those skilled in the art are within the scope of my invention. Only such limitations should be imposed on the invention as are indicated in the appended claims.

I claim:

1. The process of converting carbon monoxide with hydrogen into valuable synthetic products in the presence of a finely divided synthesis catalyst conducive to the formation of carbon at conversion conditions which comprises contacting carbon monoxide and hydrogen in synthesis proportions at synthesis conditions in a conversion zone with a relatively dilute suspension of said finely divided catalyst in a gas, controlling the amount of catalyst contained in said suspension at a concentration sufficiently low to permit conversion and resultant heat release to take place at a substantially uniform rate over an extended path of contact between reactant gases and catalyst, withdrawing unreacted carbon monoxide and hydrogen from said conversion zone and contacting said withdrawn gases with a relatively dense turbulent fluidized mass of finely divided synthesis catalyst at conditions conducive to a substantial completion of the conversion.

2. The process of claim 1 in which carbon monoxide and hydrogen are passed upwardly through said conversion zone at a velocity sufficiently high that substantial proportions of the catalyst in said conversion zone remain suspended in said withdrawn gases.

3. The process of claim 1 in which carbon monoxide and hydrogen are passed upwardly through said conversion zone at a velocity sufficiently high that substantial proportions of the catalyst in said conversion zone remain suspended in said withdrawn gases and catalyst so suspended is supplied to said mass.

4. The process of claim 1 in which said concentration is controlled by circulating a controlled amount of catalyst from said mass to said conversion zone.

5. The process of claim 1 in which said conversion zone comprises at least two separate stages arranged in series.

6. The process of claim 1 in which the degree of conversion in said conversion zone is not higher than about 90%.

7. The process of converting carbon monoxide with hydrogen into valuable synthetic products in the presence of a finely divided synthesis catalyst conducive to the formation of carbon at conversion conditions which comprises passing carbon monoxide and hydrogen gases in synthesis proportions at synthesis conditions upwardly through an extended conversion zone, supplying finely divided synthesis catalyst to said conversion zone, controlling the superficial velocity of said gases and the amount of catalyst supplied to said conversion zone so as to establish, within said conversion zone, a relatively dilute catalyst-in-gas suspension of a substantially uniform concentration sufficiently low to permit conversion and resultant heat release to take place at a substantially uniform rate over at least a major portion of said extended conversion zone, withdrawing heat from said conversion zone, withdrawing a mixture of product vapors, unreacted gases and suspended catalyst upwardly from said conversion zone, passing said unreacted gases upwardly through a dense, turbulent, fluidized mass of finely divided synthesis catalyst to substantially completely convert said unreacted gas, withdrawing volatile materials overhead from said mass and circulating finely divided catalyst from said mass to said conversion zone.

8. The process of claim 7 in which said product vapors and suspended catalyst withdrawn from said conversion zone are passed together with said unreacted gas to said mass.

9. The process of claim 7 in which volatile materials withdrawn from said mass are recycled to said conversion zone.

10. The process of claim 7 in which said conversion zone comprises at least two separate stages arranged in series and a positive temperature gradient is maintained through said stages and said mass in the direction of the gas flow.

11. The process of claim 7 in which fresh carbon monoxide and hydrogen gases are supplied at least at one point along the upward path of said gases undergoing conversion.

12. The process of claim 7 in which said catalyst is an iron catalyst.

13. The process of claim 7 in which said catalyst is an iron catalyst of high activity and selectivity to liquid products.

14. The process of claim 7 in which the catalyst suspension in said conversion zone is maintained in a plurality of elongated zones of relatively small diameter in heat exchange with a cooling medium maintained outside said elongated zones.

15. The process of claim 7 in which said mass is classified according to particle size by the action of said product vapors and unreacted gases passing upwardly through said mass and said finely divided catalyst circulated from said mass to said conversion zone essentially comprises particles of a desired size range.

WALTER G. SCHARMANN.

REFERENCES CITED

The following references are of record in the file of this patent:

UNITED STATES PATENTS

| Number | Name | Date |
| --- | --- | --- |
| 2,351,248 | Wirth et al. | June 13, 1944 |
| 2,417,164 | Huber, Jr. | Mar. 11, 1947 |